United States Patent [19]

Begun et al.

[11] Patent Number: 5,381,541
[45] Date of Patent: Jan. 10, 1995

[54] COMPUTER SYSTEM HAVING PLANAR BOARD WITH SINGLE INTERRUPT CONTROLLER AND PROCESSOR CARD WITH PLURAL PROCESSORS AND INTERRUPT DIRECTOR

[75] Inventors: Ralph M. Begun; Michael R. Turner, both of Boca Raton, Fla.

[73] Assignee: International Business Machines Corp., Armonk, N.Y.

[21] Appl. No.: 67,361

[22] Filed: May 26, 1993

[51] Int. Cl.⁶ .......................................... G06F 13/14
[52] U.S. Cl. ................................. 395/500; 395/325; 395/700
[58] Field of Search ................ 395/325, 650, 725, 775, 395/500

[56] References Cited

U.S. PATENT DOCUMENTS

| | | | |
|---|---|---|---|
| 4,268,904 | 5/1981 | Suzuki et al. | 395/275 |
| 4,271,468 | 6/1981 | Christensen et al. | 395/275 |
| 4,644,465 | 2/1987 | Imamura | 395/725 |
| 4,727,480 | 2/1988 | Albright et al. | 395/500 |
| 4,833,598 | 5/1989 | Imamura et al. | 395/650 |
| 4,914,570 | 4/1990 | Peacock | 395/650 |
| 4,933,846 | 6/1990 | Humphrey et al. | 395/325 |
| 4,959,781 | 9/1990 | Rubinstein et al. | 395/725 |
| 4,965,717 | 10/1990 | Cutts, Jr. et al. | 395/575 |
| 5,003,466 | 3/1991 | Schan, Jr. et al. | 395/575 |
| 5,043,882 | 8/1991 | Ikeno | 395/725 |
| 5,067,071 | 11/1991 | Schanin et al. | 395/275 |
| 5,155,838 | 10/1992 | Kishi | 395/500 |
| 5,179,707 | 1/1993 | Piepho | 395/725 |

Primary Examiner—Parshotam S. Lall
Assistant Examiner—Viet Vu
Attorney, Agent, or Firm—Robert S. Babayi

[57] ABSTRACT

A multiprocessor computer includes a planar board and a processor card mounted on the planar board. An interrupt controller is mounted on the planar board and has a plurality of interrupt input lines for receiving interrupt requests from a plurality of interrupting devices. The interrupt controller also has an output line that transmits an interrupt to the processor card. The processor card includes an interrupt director having a plurality of interrupt request lines respectively connected to interrupt request pins of the different processors. The director is also connected to the output line coming from the interrupt controller. In response to receiving an interrupt request from the interrupt controller, the director performs an interrupt acknowledge cycle and transmits an interrupt request, on only one of the interrupt request lines, to a specific processor predetermined by the director. The specific processor then reads an interrupt vector from the director. The interrupt vector uniquely identifies the interrupt level and is used by the processor to execute an interrupt handler for that specific interrupt level.

6 Claims, 4 Drawing Sheets

COMPUTER SYSTEM HAVING PLANAR BOARD WITH SINGLE INTERRUPT CONTROLLER AND PROCESSOR CARD WITH PLURAL PROCESSORS AND INTERRUPT DIRECTOR

BACKGROUND OF THE INVENTION

1. Field of the Invention

This invention relates to the field of data processing, and, more particularly, to an improved multiprocessor computing system having an interrupt director on a processor card for directing interrupts from an interrupt controller on a planar board to predetermined ones of plural processors on the card.

2. Description of Related Art

Interrupts are signals generated in response to the occurrence of events external to a processor, which cause the processor to suspend execution of a program, process the interrupt, and then resume execution of the program from the point at which the program was suspended. Hardware interrupts are normally generated by interrupting devices to notify the processor when external events occur. Such events commonly include keystrokes, lapse of periodic time intervals, serial port communications, etc.

Commercially available personal computer systems, such as IBM PS/2 computer systems, include a microprocessor having an interrupt request pin for receiving an interrupt request. An interrupt controller receives interrupts from the interrupting devices, prioritizes the interrupts when more than one interrupt has occurred, and transmits an interrupt request signal to the processor. The interrupt controller also stores an interrupt vector that uniquely identifies the particular interrupt. In response to receiving the interrupt request, the processor then performs an interrupt acknowledge cycle and reads the interrupt vector from the interrupt controller. The processor uses such vector to access and execute an interrupt handler program that processes the particular interrupt.

An example of such a computer system is shown in FIG. 1 which generally illustrates the interrupt system of an IBM model 90 or 95 personal computer 10. Computer 10 includes a processor card 12 plugged into edge connectors 13 on a planar board 11. An Intel 486 microprocessor 14 is mounted on processor card 12 and is connected to a local bus 16 having conventional data, address, control and arbitration lines or busses. Various local devices 18 (such as a level two cache, read only memory devices, or local communication ports), arbitration logic 17, and a dual port memory controller 20 are also connected to bus 16. Memory controller 20 is further connected by a system bus 22 to a direct memory access (DMA) controller 24 and to an expansion bus controller 26.

Memory controller 20 and bus controller 26 are respectively connected to a memory bus 32 and to an expansion bus 28 conforming to the publicly known IBM MicroChannel architecture. (PS/2 and MicroChannel are trademarks of IBM) Busses 32 and 28 extend between processor card 12 and planar board 11 and are respectively connected to system memory 34 and to an interrupt controller 36 and MicroChannel connectors 30. System memory 34 comprises a plurality of dynamic random access memory (DRAM) modules. Connectors 30 provides a plurality of slots for connection to different conventional expansion and I/O devices (not shown). Controller 36 is a cascaded pair of Intel 8259A programmable interrupt controllers (or equivalent) having a plurality of input lines 38 for connection to a plurality of interrupting devices 41. Controller 36 is also connected by a single signal line 40 to interrupt request input pin 42 of microprocessor 14. For simplicity of illustration, the remaining standard pins of microprocessor 14 have been omitted, and pin 42 is omitted from FIG. 2.

When one or more interrupting devices sends an interrupt to controller 36, priority logic 39 determines which interrupt will be first processed and then transmits an interrupt request signal INT on line 40 to the microprocessor. Controller 36 also includes an interrupt vector register (IV REG) 37 for temporarily storing an interrupt vector that identifies the particular interrupt. Computer 10 is configured to handle sixteen different interrupts that are specifically identified by the four low-order bits of the interrupt vector.

Since a number of different events may trigger the single interrupt request signal INT, microprocessor 14 becomes informed of the specific interrupting device by a special protocol known as an interrupt acknowledge cycle or process. In accordance with such process, when controller 36 transmits the INT signal, it also stores an interrupt vector in register 37 from which the vector can be read by the microprocessor. In response to receipt of the INT signal, microprocessor 14 generates an acknowledge cycle during which controller 36 transmits interrupt vector to the processor over the data bus in busses 28, 22 and 16. The interrupt vector is a single byte containing eight bits which uniquely identify which the interrupting device is the source of the interrupt. The specific microprocessor and interrupt acknowledge cycle are described in various publications including "i486 TM MICROPROCESSOR", published by Intel Corporation, 1989, to which reference may be had for further details.

One of the objectives of the Models 90 and 95 computers was to design the planar board so that the computer can be upgraded by replacing processor card 12 with an upgraded processor card without replacing planar board 11. The upgraded processor card could include a higher performance processor, for example, or it could include plural processors that create a multiprocessor computer. The problem which the present invention addresses is the design of an interrupt handling facility for a multiprocessor system having only one interrupt controller. One possible solution would be to design the system so that all external interrupts are handled by a single processor, but such a design would be disadvantageous because of the possibility of severe software restrictions or performance bottlenecks occurring. Rather than using a single processor to handle and process the interrupts, it is advantageous to design the system so that each interrupting device be capable of interrupting any specific processor.

A possible solution that allows each interrupting device to interrupt any specific processor, would be easy to implement in a personal computer as long as interrupt controller 36 can be modified or duplicated. However, since interrupt controller 36 is on planar board 11 and cannot be modified or duplicated without changing the planar board, it would seem to be impossible to provide a multiprocessor card upgrade, for such models, using an interrupt handling scheme in which each interrupting device is capable of interrupting any specific processor. The invention provides a solution to such problem.

The prior art discloses multiprocessor interrupt handling schemes that differ from that of the invention. U.S. Pat. No. 4,914,570—Peacock discloses a multiprocessor system in which software and processor-to-processor interrupts are used to transfer a process from one processor to another processor.

U.S. Pat. No. 4,933,846—Humphrey et al discloses a large network communications system having a polled interrupt mechanism that supports multiple processors. An interrupt bus is connected to the various processors. Interrupt identifier codes are generated in a timed sequence and transmitted over the interrupt bus to the plural processors. Each processor includes circuitry for recognizing its own identifier code and responding to the interrupt.

U.S. Pat. No. 4,959,781—Rubinstein et al discloses an interrupt handling mechanism for a multiprocessor system. When an interrupt occurs, an attempt is made to assign the interrupt to the currently least-busy processor. The mechanism uses an interrupt bus common to all processors. A dedicated interrupt processor receives signals from external devices and then broadcasts the desired processor and interrupt level across the interrupt bus to all processors.

U.S. Pat. No. 4,965,717—Cutts Jr. et al discloses an interrupt handling mechanism for synchronizing interrupt handling between multiple processors to which interrupts are signalled in parallel. The invention does not require synchronization of interrupts between plural processors.

U.S. Pat. No. 5,067,071—Schanin et al discloses a multiprocessor system having an interrupt handling facility which includes a special vector bus, in addition to normal address, data, and control busses. The requestor or interrupting device determines with the particular CPU or the CPU class for handling the interrupt, and the interrupt vectors are sent to all CPU but are accepted by only the particular CPU selected to handle the interrupt.

SUMMARY OF THE INVENTION

One of the objects of the invention is to provide a novel interrupting mechanism or facility for a multiprocessor computing system.

Another object of the invention is to provide a personal computer having a planar board and an upgraded multiprocessor card, with a novel interrupting facility for handling hardware interrupts.

A further object of the invention is to provide a multiprocessor processor card for a computer having a planar board with a single interrupt controller thereon, which processor card includes a novel interrupt director for directing interrupts from any of a plurality of interrupting devices to a specific processor.

Briefly, in accordance with the invention, a computer includes a planar board and a processor card mounted on the planar board. An interrupt controller is mounted on the planar board and has a plurality of interrupt input lines for receiving interrupt requests from a plurality of interrupting devices. The interrupt controller also has an output line that transmits an interrupt to the processor card. The processor card includes an interrupt director having a plurality of interrupt request output lines respectively connected to interrupt request input pins of the different processors. The director is also connected to the output line coming from the controller. In response to receiving an interrupt request from the interrupt controller, the director performs an interrupt acknowledge cycle and transmits an interrupt request, on only one of the interrupt request lines, to a specific processor predetermined by the director. The specific processor then reads an interrupt vector from the director. The interrupt vector uniquely identifies the interrupt level and is used by the processor to execute an interrupt handler for that specific interrupt level.

BRIEF DESCRIPTION OF THE DRAWINGS

Other objects and advantages of the invention will be apparent from the following description taken in connection with the accompanying drawings wherein.

DESCRIPTION OF ILLUSTRATIVE EMBODIMENT

Figure 1:
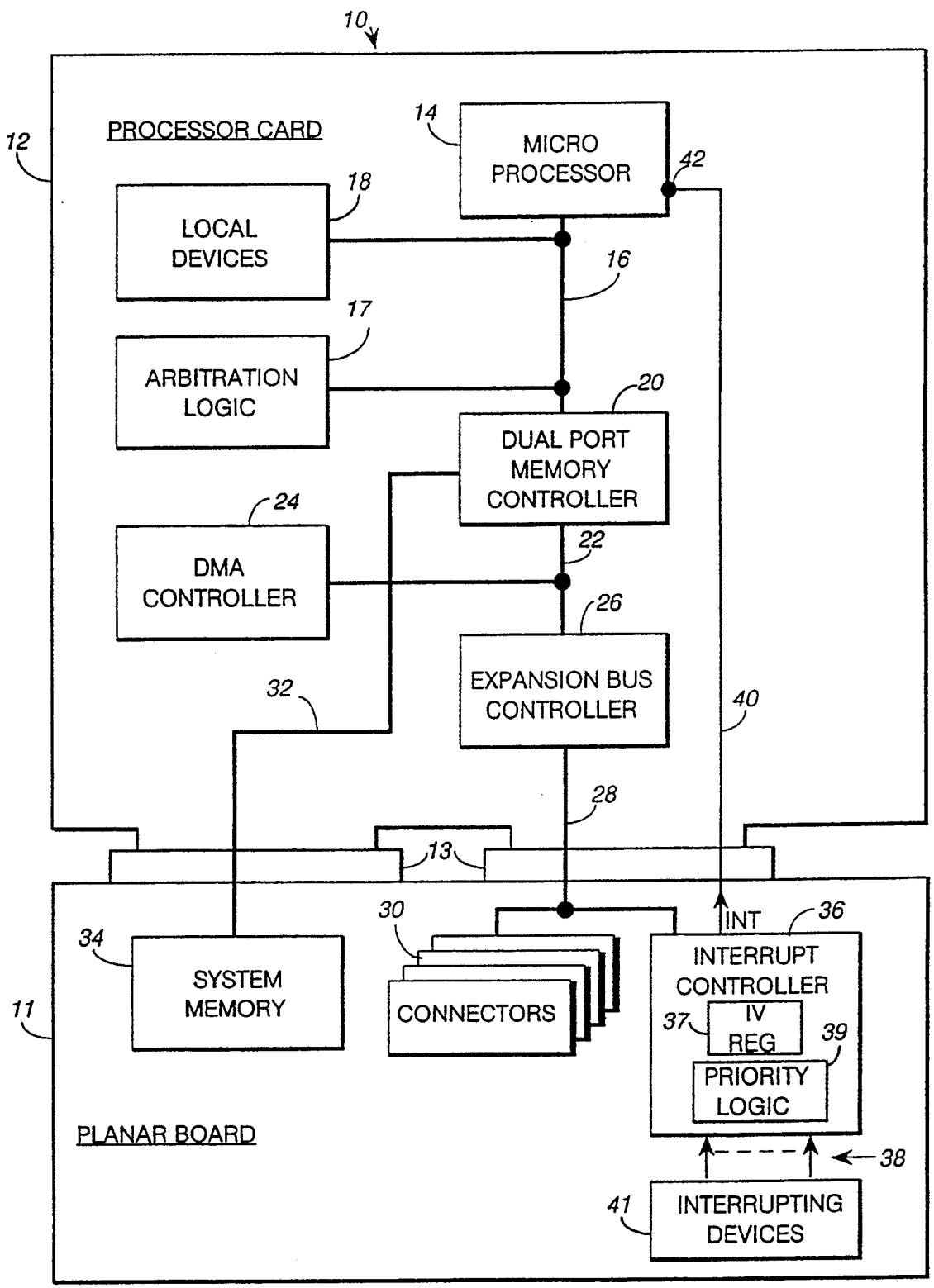
FIG. 1 is a block diagram of a prior art data processing system having a single processor.
Figure 2:
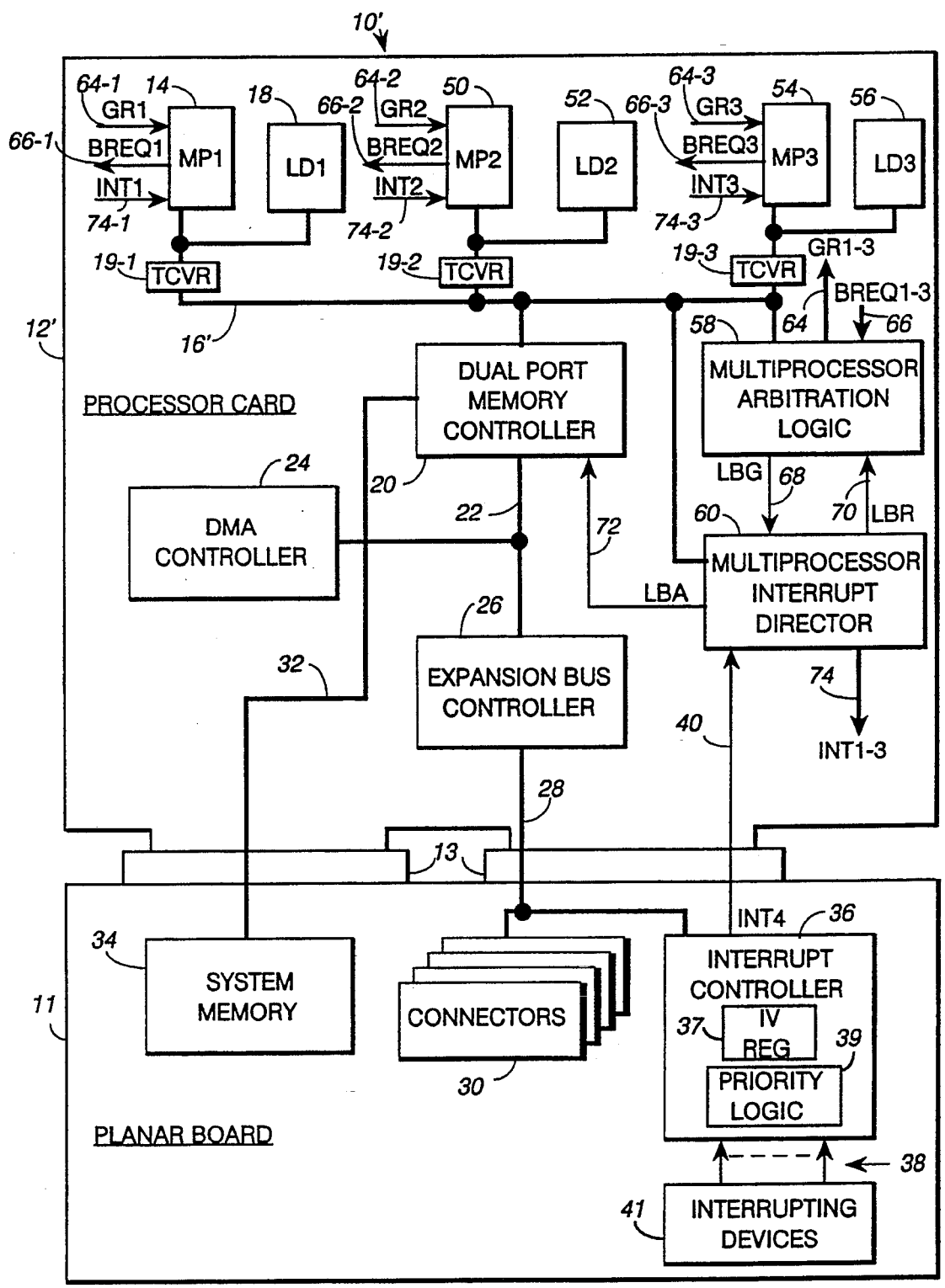
FIG. 2 is a block diagram of a multiprocessor data processing system embodying the invention.

With reference to FIG. 2, a multiprocessor personal computer 10' comprises a planar board 11 and a processor card 12' mounted on or connected to such board. Processor card 12' differs from card 12 (FIG. 1) primarily by the addition of two microprocessors MP2 and MP3, local devices LD2 and LD3, and multiprocessor interrupt director logic 60, and related circuit connections, and by the substitution of multiprocessor arbitration logic 58 for logic 17 (FIG. 1). In FIG. 2, microprocessor 14 is also designated MP1, and local devices 18 are also designated as LD1. Additionally, MP2, LD2, MP3 and LD3 are also referenced as 50, 52, 54, and 56. Local bus 16' is a multiprocessor local bus that is connected to the above additions and includes a plurality of transceivers (TCVRs) 19 that isolate the sections of the local bus that are respectively connected to the processors. Card 12' is a multiprocessor upgrade card that is a replacement for processor card 12 and is designed to be plugged into planar board 11 without having to change or modify planar board 11 or any of the components thereon. The computer thus includes a tightly coupled multiprocessor arrangement in which the system memory and I/O devices are shared by each of the processors.

Processor MP1 has an input line 74-1 for receiving input request signal INT1, an input line 64-1 for receiving a local bus grant signal GR1, and an output line 66-1, for sending a bus request signal BREQ1. Processors MP2 and MP3 have similar lines for receiving and sending similar signals. The interrupt request signals INT1–INT3 are selectively transmitted on lines 74 from interrupt director 60. The bus grant signals GR1–GR3 are selectively transmitted on lines 64 from arbitration logic 58. The bus request signals BREQ1–BREQ3 are transmitted on lines 66 to arbitration logic 58.

Figure 3:
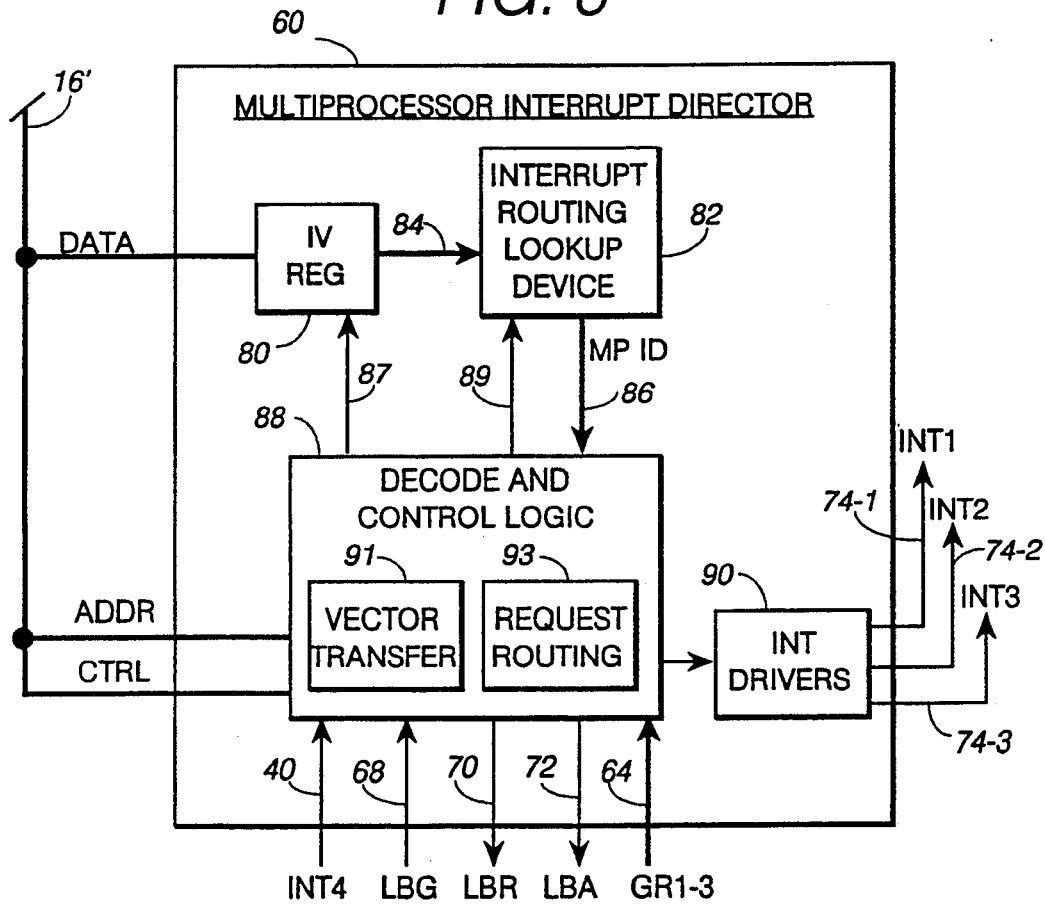
FIG. 3 is a more detailed block diagram of the multiprocessor interrupt director shown in FIG. 2.

Arbitration logic 58 is connected to bus 16' and includes input lines 66 and 70 for receiving bus access request signals BREQ1–BREQ3 from processors 14, 50, and 54 and local bus request (LBR) signals from director 60. Logic 58 also has a plurality of output lines 64 and 68 for transmitting bus grant signals GR1-GR3 to the processors and local bus grant (LBG) signals to director 60. The GR1-3 signals are also transmitted over lines 64 to decode and control logic 88 (FIG. 3). Memory controller 20 has an input line 72 for receiving a local bus access (LBA) signal that selectively disables the controller and prevents the memory controller from propagating interrupt acknowledge signals to interrupt controller 36, as described hereinafter. To the extent thus far described, the multiple processors MP1-MP3, multiprocessor local bus 16', and multiprocessor arbitration logic 58, are standard elements of any tightly coupled multiprocessor system. The LBA signal has also been used in systems for controlling bus cache devices.

Referring to FIG. 3, multiprocessor interrupt director 60, referred to hereafter simply as the "director", comprises an interrupt vector (IV) register (REG) 80, an interrupt routing lookup device 82, decode and control logic 88, and interrupt (INT) drivers 90. Interrupt routing lookup device stores preassigned microprocessor identifiers (MP IDs) as a function of IV indexes. There are sixteen IV indexes corresponding to the sixteen different interrupts that computer 10' is configured for. Each index is derived from the four low-order bits of an interrupt vector stored in IV REG 80. Lookup device 82 has inputs connected to outputs of register 80 by lines 84. Register 80 has inputs connected to the data lines of bus 16' and provides a path or means through which routing device 82 can be loaded with preassigned values of MP IDs, under software control, during system initialization. An exemplary set of preassigned MP ID values, is listed in Table I:

TABLE I

| INT INDEX | MP ID | INT INDEX | MP ID |
| --- | --- | --- | --- |
| 0 | 1 | 8 | 2 |
| 1 | 1 | 9 | 2 |
| 2 | 1 | 10 | 3 |
| 3 | 1 | 11 | 3 |
| 4 | 2 | 12 | 3 |
| 5 | 2 | 13 | 1 |
| 6 | 2 | 14 | 2 |
| 7 | 2 | 15 | 2 |

During interrupt handling, IV REG 80 temporarily stores an interrupt vector transmitted from interrupt controller 36 so that the interrupt vector can later be read, during an emulated acknowledgement cycle, by the microprocessor assigned to process the particular interrupt. Also, during interrupt handling, lines 84 input an IV index from IV REG 80 to routing device 82 for looking up the predetermined MP ID assigned to the particular interrupt corresponding to the IV index. Device 82 has outputs connected by lines 86 to inputs of logic 88 for transmitting the looked up MP ID from device 82 to logic 88.

Decode and control logic 88 is connected to the address (ADDR) and control (CTRL) lines of local bus 16' and has two input lines 40 and 68 respectively connected to receive an INT4 interrupt signal from controller 36 and a local bus grant signal LBG from arbitration logic 58. Logic 88 is further connected to lines 64 to receive the GR1-GR3 signals. Logic 88 also has two output lines 70 and 72 for respectively transmitting local bus request signal LBR to arbitration logic 58 and LBA signal to memory controller 20. Logic 88 is also connected to INT drivers 90 which selectively generate and transmit the interrupt signals INT1-INT3 to the selected multiprocessor MPx, where MPx is either MP1, MP2, or MP3. Logic 88 has two control lines 87 and 89 respectively connected to register 80 and device 82 for controlling operation thereof. Logic 88 comprises a means 91 for controlling interrupt vector transfer from the interrupt controller 36 to director 60 and to a selected microprocessor, and a means 93 for controlling interrupt request routing from interrupt controller 36 to director 60 and to the selected processor, in the manner described hereinafter.

OPERATION

Figure 4:
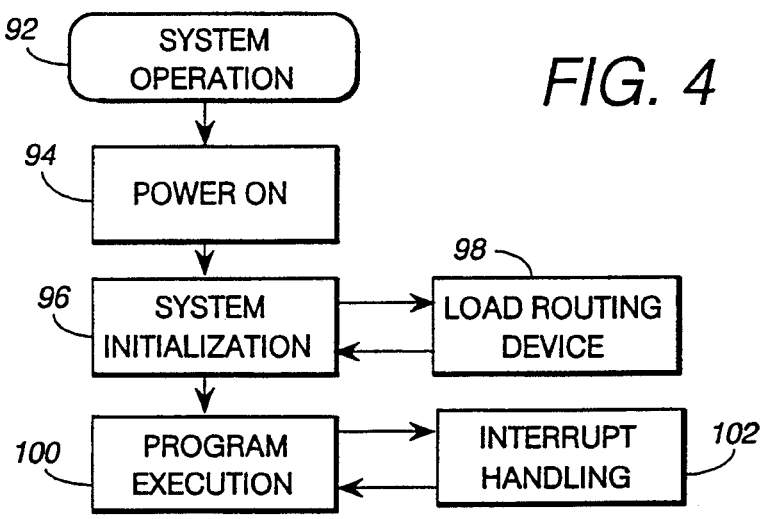
FIG. 4 is a flow chart of general system operations.

With reference to FIG. 4, the general system operation 92 commences with the power being turned on in step 94. Step 96 then initializes the system in the normal manner except that the initialization is modified to include step 98 which loads routing lookup device 82 with the MP IDs as a function of the IV INDEX. After initialization, the system then commences normal program execution 100. When an interrupt occurs, the normal program execution is suspended and the interrupt is handled or processed in step 102. Upon completion of the interrupt handling, a return is made to program execution 100 which then continues at the point of suspension.

Figure 5:
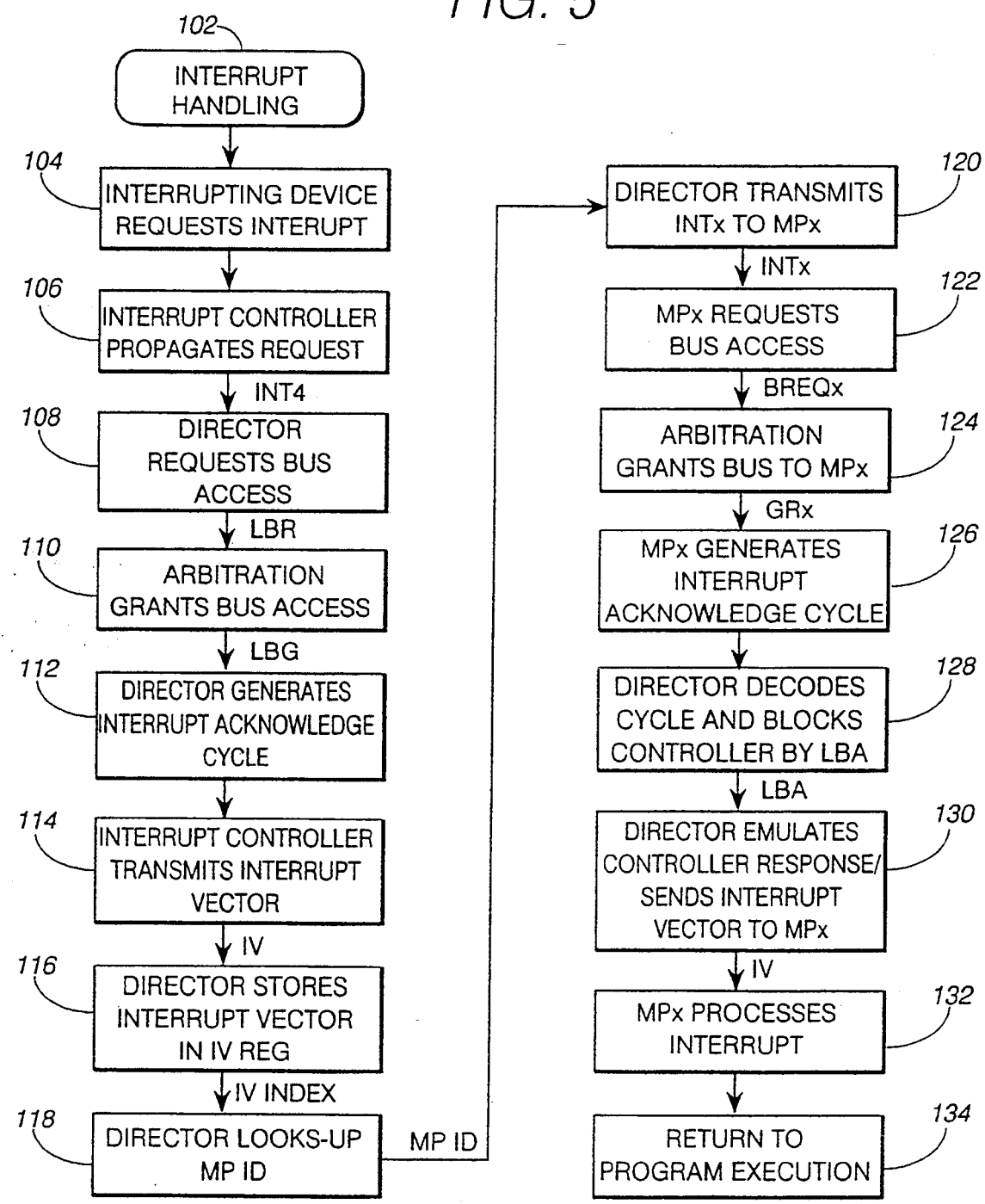
FIG. 5 is a flow chart of the interrupt handling process shown in FIG. 4.

The sequence of interrupt handling operations is illustrated in FIG. 5. The following description references items in FIGS. 2, 3 and 5. Interrupt handling 102 begins in step 104 with one or more interrupting devices 41 detecting the occurrence of an external event(s). For simplicity, assume that only one event has occurred and the interrupting device, that has detected the occurrence of the event, transmits an interrupt signal over one of lines 38 to interrupt controller 36. In response to receipt of such interrupt, controller 36 stores the interrupt vector, corresponding to the interrupt in register 37. Controller 36 then transmits, in step 106, an INT4 interrupt request signal to director 60. In response to receiving interrupt request signal INT4, director 60 requests (step 108) access to local bus 16' by transmitting an LBR signal on line 70 to arbitration logic 58. Assuming there is no higher priority request, arbitration logic 58 then grants the request and transmits LBG signal on line 68 to director 60, in step 110.

In response to the receipt of the LBG signal, director 60 then generates an interrupt acknowledge cycle in step 112 in accordance with the standard protocol used by a processor. In step 114, interrupt controller responds to the interrupt acknowledge cycle by transmitting the interrupt vector IV stored in register 37. Such IV is received by director 60 and stored in register 80, in step 116. Director 60, in step 118, then derives the IV index from IV REG 80 and uses it to look up the MP ID of the processor MPx preassigned to handle the interrupt. Then, director 60 selectively activates one of drivers 90 to send an interrupt request INTx to the specific microprocessor MPx, in step 120. The INTx signal is not broadcast or transmitted to any other microprocessor. Thus, director 60 effectively receives an interrupt request from interrupt controller 36 and routes or directs the request to the microprocessor assigned to handle and process the interrupt. Request routing means 93 controls the routing of an interrupt request from the interrupt controller to the specific processor MPx and performs steps 118 and 120.

In response to receiving the INTx signal, the selected MPx then requests a bus access in step 122 by sending BREQx signal to arbitration logic 58. In response thereto, logic 58 sends a bus grant signal GRx to MPx in step 124. MPx then proceeds in step 126 to generate an interrupt acknowledge cycle. In step 128, director 60 decodes or detects the bus acknowledge cycle, and then sends a local bus access signal LBA to memory controller 20 to block the propagation of the interrupt cycle signals to interrupt controller 36. Director 60 then emulates, in step 130, what would have been the interrupt controller response, by transmitting the interrupt vector stored in register 80, to MPx. In response to the receipt of the vector, MPx then processes the particular interrupt be executing the interrupt handler for such interrupt, in step 132. Upon completion of processing the interrupt, a return is made in step 134 to the program that was being executed at the time the interrupt occurred. Vector transfer means 91 performs steps 108, 112, 116, 128, and 130 and thereby is operative to transfer the interrupt vector from register 37 to register 80 and thence to the selected microprocessor MPx.

As an example of how the above process operates, assume that routing device 82 has been loaded with the MP ID values listed in Table I above. Assume also that an interrupt has occurred which causes an interrupt vector, having a value of "9", to be stored in IV reg 80 during step 116. As a result of step 118, an MP ID of "2" is transmitted indicating that MP2 is the processor selected to process the interrupt. Thus steps 120, 122, and 124 respectively produce INT2, BREQ2, and GR2 signals, which cause corresponding operations to occur.

In summary of an interrupt handling operation, when an interrupt occurs, interrupt controller 36 stores an interrupt vector corresponding to the interrupt and transmits an interrupt request to director 60. In response to receiving the interrupt request, director 50 generates an interrupt acknowledge cycle during which the interrupt vector is transferred from the interrupt controller to the interrupt director. In response to receiving the interrupt vector, director 60 looks up the identity of the processor that has been preassigned to handle the specific interrupt and sends an interrupt request to only that processor. In response to receiving the interrupt request, the specific processor then suspends execution of the current program and generates an interrupt acknowledge cycle during which the director blocks the interrupt controller from responding during the cycle. Instead, director 60 responds directly to the processor by transmitting the interrupt vector to the processor as part of the interrupt acknowledge cycle. The processor then processes the interrupt by executing the appropriate interrupt handler identified by the interrupt vector. Upon completion of the interrupt processing, control is returned to execution of the program that was interrupted.

It should be apparent to those skilled in the art that additional interrupt vector registers and enhanced control logic can be added to support multiple concurrent interrupts to the multiprocessors. It should also be apparent that many changes can be made in the details and arrangements of steps and parts without departing from the scope of the invention as defined in the appended claims.

What is claimed is:

1. A personal computer comprising:
    a planar board;
    a single interrupt controller means mounted on said planar board, said interrupt controller means having
    a plurality of input lines for exclusively receiving all interrupts from a plurality of interrupting devices,
    an output line,
    means for transmitting a first interrupt request on said output line in response to receiving a first interrupt on one of said input lines, and
    a first interrupt vector register for storing an interrupt vector identifying said first interrupt;
    a multiprocessor upgrade card mounted on said planar board and comprising a plurality of processors and an interrupt director for upgrading said personal computer to operate as a multiprocessor system;
    said plurality of processors being mounted on said multiprocessor upgrade card, each of said processors having an interrupt request input pin for selectively receiving a second interrupt request; and
    said interrupt director being mounted on said multiprocessor upgrade card, said interrupt director comprising
    an input line connected to said output line from said interrupt controller means for receiving said first interrupt request,
    a plurality of director output lines corresponding in number to the number of said processors and being respectively connected to different interrupt request input pins of said processors,
    lookup means for storing a plurality of processor identifiers that indicate which processor is assigned to handler each interrupt,
    a second interrupt vector register,
    interrupt vector transfer means, and
    interrupt routing means;
    said interrupt vector transfer means being operative, in response to said director receiving said first interrupt request, to generate a first interrupt acknowledge cycle during which said interrupt vector is transmitted from said first interrupt vector register to said second interrupt vector register;
    said interrupt routing means being operative, in response, to receiving said first interrupt request from said interrupt controller means, to first look up in said lookup means the identifier of which processor is assigned to handle said first interrupt and to then generate and transmit said second interrupt request, on only one of said director output lines, to the processor assigned to handle said first interrupt; and
    said processor assigned to handle said first interrupt being operative, in response to receiving said second interrupt request, to generate a second interrupt acknowledge cycle during which said interrupt vector in said second interrupt vector register is read by such processor to handle said first interrupt.

2. A personal computer in accordance with claim 1 wherein said interrupt vector in said second interrupt vector register provides an index into said lookup means.

3. A personal computer in accordance with claim 1 comprising:
    bus means connected between said processors, said director, and said interrupt controller and comprising selectively actuated means for blocking signals during said second interrupt acknowledge cycle from reaching said interrupt controller.

4. A personal computer comprising:

a plurality of interrupting devices for generating interrupts;

a planar board having only a single interrupt controller mounted thereon;

said interrupt controller being operative to exclusively process all of said interrupts from said interrupting devices, said interrupt controller comprising a plurality of input lines for receiving all of said interrupts from said interrupting devices, a first interrupt vector register for storing an interrupt vector in response said interrupt controller receiving a first interrupt from one of said interrupting devices, said interrupt vector identifying which one of said interrupting devices generated said first interrupt, an output line, and means for generating and transmitting a first interrupt request on said output line in response to said interrupt controller receiving said first interrupt on one of said input lines;

a multiprocessor upgrade card having a plurality of processors mounted thereon for upgrading said personal computer to operate as a multiprocessor system, said multiprocessor upgrade card being mounted on said planar board, each of said processors having an interrupt request input pin for receiving interrupt requests; and an interrupt director mounted on said multiprocessor upgrade card, said interrupt director comprising a director input line connected to said output line from said interrupt controller for receiving said first interrupt request, a plurality of director output lines respectively connected to different interrupt request input pins of said processors, a second interrupt vector register, interrupt vector transfer means operative in responsive to said director receiving said first interrupt request on said director input line, to perform a first interrupt acknowledgement cycle and transfer said first interrupt vector from said first interrupt vector register into said second interrupt vector register, and interrupt routing means operative, in response to said interrupt vector in said second vector register, to generate and transmit a second interrupt request on only one of said director output lines to a specific processor predetermined to handle said first interrupt; and said specific processor, to which said second interrupt request is transmitted, is operative, in response to receiving said second interrupt request, to perform a second interrupt acknowledgement cycle, read said interrupt vector from said second interrupt vector register, and handle said first interrupt.

5. A personal computer in accordance with claim 4 comprising means for blocking transfer of said interrupt vector from said first interrupt vector register to said specific processor during said first interrupt acknowledge cycle.

6. A personal computer in accordance with claim 4 comprising:

a lookup table in said interrupt routing means for storing processor identifiers indicating which processors are assigned to process which interrupts; and said interrupt routing means is operative, in response to said first interrupt vector transferred to said second interrupt vector register, to first use said interrupt vector as an index and look up in said lookup table which one of said processors is assigned to handle said first interrupt and to then generate and transmit said second interrupt request signal to the specific processor assigned to handle said first interrupt.

\* \* \* \* \*